(12) United States Patent
Lin et al.

(10) Patent No.: US 11,646,768 B2
(45) Date of Patent: *May 9, 2023

(54) METHOD AND APPARATUS FOR DOWNLINK TRANSMISSION IN A CLOUD RADIO ACCESS NETWORK

(71) Applicant: HON LIN TECHNOLOGY CO., LTD., Taipei (TW)

(72) Inventors: Tzu-Yu Lin, Hsinchu (TW); Shang-Ho Tsai, Hsinchu (TW); Yu-Heng You, Hsinchu (TW); Hsin-Hung Chou, Hsinchu (TW); Wei-Han Hsiao, Hsinchu (TW)

(73) Assignee: HON LIN TECHNOLOGY CO., LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,249

(22) Filed: Apr. 1, 2022

(65) Prior Publication Data

US 2022/0224378 A1    Jul. 14, 2022

Related U.S. Application Data

(63) Continuation of application No. 17/032,339, filed on Sep. 25, 2020, now Pat. No. 11,329,700.

(60) Provisional application No. 62/926,694, filed on Oct. 28, 2019.

(51) Int. Cl.
*H04B 7/024* (2017.01)
*H04B 7/06* (2006.01)
*H04L 5/00* (2006.01)
*H04L 25/02* (2006.01)

(52) U.S. Cl.
CPC .......... *H04B 7/024* (2013.01); *H04B 7/0626* (2013.01); *H04B 7/0632* (2013.01); *H04L 5/0035* (2013.01); *H04L 25/0206* (2013.01)

(58) Field of Classification Search
None
See application file for complete search history.

(56) References Cited

U.S. PATENT DOCUMENTS

| 11,329,700 | B2 * | 5/2022 | Lin | H04B 7/0626 |
| 2013/0243075 | A1 * | 9/2013 | Dalela | H04L 65/752 375/E7.026 |
| 2015/0124673 | A1 * | 5/2015 | Ouchi | H04W 52/58 370/311 |
| 2016/0242147 | A1 * | 8/2016 | Tarlazzi | H04W 88/085 |
| 2017/0238361 | A1 | 8/2017 | Pawar et al. | |
| 2017/0311183 | A1 | 10/2017 | Cotanis | |
| 2018/0062801 | A1 | 3/2018 | Zhang et al. | |

(Continued)

*Primary Examiner* — Phirin Sam
(74) *Attorney, Agent, or Firm* — ScienBiziP, P.C.

(57) ABSTRACT

A method for downlink transmission in a cloud radio access network for a number of users is applied in a central unit. The central unit determines a specific number of remote radio heads (RRHs) as non-serving RRHs based on a predetermined data compression ratio. For each of many pieces of user equipment (UEs), the central unit determines a combination of RRHs which are non-serving in coordinated multi-point transmission (CoMP) from a plurality of RRHs based on the determined specific number, and then performs CoMP downlink transmission based on the combination of RRHs which are non-serving in the CoMP.

10 Claims, 6 Drawing Sheets

(56) References Cited

U.S. PATENT DOCUMENTS

2018/0176898 A1 6/2018 Yu et al.
2020/0366542 A1* 11/2020 Barbieri .................. H04L 69/32

* cited by examiner

METHOD AND APPARATUS FOR DOWNLINK TRANSMISSION IN A CLOUD RADIO ACCESS NETWORK

FIELD

The subject matter herein generally relates to radio communications.

BACKGROUND

The technology of cloud radio access network (C-RAN) is part of the main technology in the fifth generation of mobile communication (5G). The C-RAN centralizes baseband units (BBUs) of distributed base stations in an area to form a BBU resource pool. Baseband signals of the remote radio heads (RRHs) in this area are processed in the same BBU pool.

Faced with the huge data-transmission amounts between RRHs and a number of user equipment (UEs), the overall performance can be enhanced through cooperative transmission between RRHs. The cooperative transmission between RRHs can improve the overall performance but requires higher fronthaul capacity compared to non-cooperative transmissions.

Thus, there is room for improvement within the art.

BRIEF DESCRIPTION OF THE DRAWINGS

Implementations of the present technology will now be described, by way of embodiment, with reference to the attached figures, wherein.

DETAILED DESCRIPTION

Figure 1:
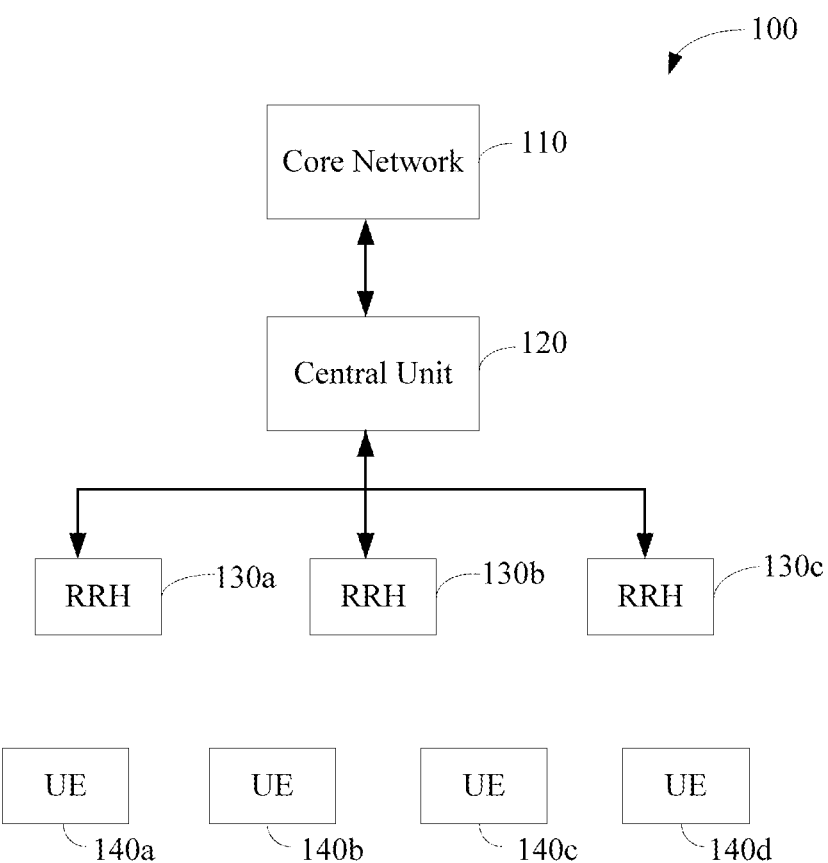
FIG. 1 is a block diagram of one embodiment of a cloud radio access network (C-RAN).

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or another storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a high-level architecture of cloud radio access network (C-RAN) 100 according to one embodiment. The C-RAN 100 comprises a core network 110, a central unit 120, a plurality of remote radio heads (RRHs), for example, RRHs 130a, 130b, and 130c, and a plurality of user equipment (UEs), for example, UEs 140a, 140b, 140c, and 140d. The set of RRHs 130a, 130b, and 130c are connected to a baseband unit (BBU) pool, which comprises the central unit 120, through high bandwidth transport links known as fronthaul (FH). The set of RRHs 130a, 130b, and 130c can send and receive radio signals from the plurality of UEs 140a, 140b, and 140c through wireless interfaces. The central unit 120 can be in communication with the core network 110. In one example, data from the core network 110 to the UE 140a, which is in a coverage area of the RRH 130a, can first be sent to the central unit 120. The central unit 120 then sends the data to the RRH 130a through a fronthaul link. The data can finally be sent through a radio signal from the RRH 130a to the UE 140a. This is referred to as a downlink transmission.

Figure 2:
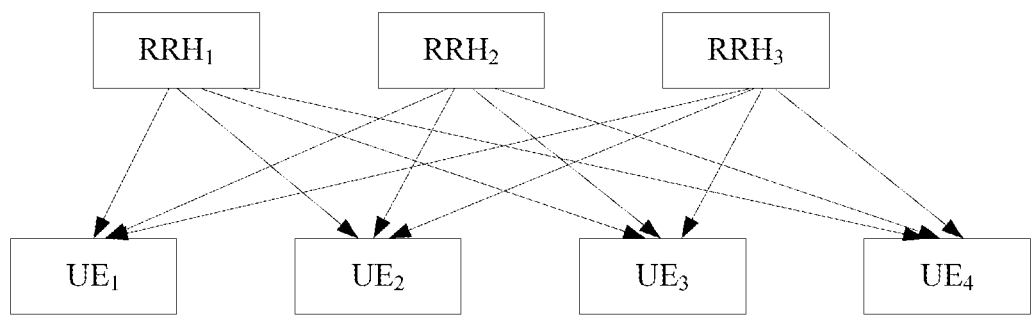
FIG. 2 is an example of one embodiment of a coordinated multi-point downlink transmission scenario in the C-RAN.

In one embodiment, the C-RAN 100 performs coordinated multi-point (CoMP) transmission on the downlink to enhance system performance and user-experienced service quality. The CoMP transmission means that the data is transmitted to a UE jointly from the set of RRHs, thereby not only reducing the interference but also increasing the received power. The transmission from the set of RRHs can also take channel conditions at the different UEs into account to enhance the received signal strength, while the same time reducing the interference between different transmissions. FIG. 2 illustrates an example of a CoMP downlink transmission scenario in the C-RAN 100. In the example, the N=3 RRHs are geographically distributed while the K=4 UEs are in a group requiring wireless data services. For simplicity, single antenna is used at the RRHs and the UEs. In order to set up CoMP, there are several steps needing to be executed by the RRHs and the UEs: Step (1), the RRHs send pilots in the downlink so that the UEs can acquire the channel state information (CSI) for this link. Step (2), the UEs feed the CSI back to their serving RRH, typically its strongest BS. Step (3), the CSI acquired at the RRHs is forwarded to the central unit 120 of the C-RAN 100 to compute the precoding weights to mitigate interference. Step (4), the UE data is routed to the RRHs based on the precoding weights. Finally, the UEs are served. That is, each one of the UEs participating in CoMP will feed the CSI back over the air to its serving RRH, then forwarding to the central unit 120 for precoding, imposing a heavy burden on the fronthaul traffic. As the precoding weights computed at the central unit 120 needs to be transmitted to all the RRHs along with the UE data, this can further overwhelm the backhaul, especially for a scenario which includes a large number of UEs. In fact, it is not necessary for all the RRHs to serve one UE at the same time. In one example, the first UE (that is, $UE_1$ in the FIG. 2) can select the second RRH (that is, $RRH_2$ in FIG. 2) to perform no service. In the example, the central unit 120 can design the precoding weights with $f_{2,1}=0$ and format the aggregated channel matrix with $h_{2,1}=0$, where $f_{2,1}$ is the precoding weight for the first UE at the second RRH, and $h_{2,1}$ is the channel matrix from the second RRH to the first UE. Then the fronthaul traffic between the second RRH and the central unit 120 can be compressed. If each UE selects a subset of RRHs to provide service, both the precoding weights and the aggregated channel matrix are sparse, thus reducing the fronthaul load. In one embodiment, the data compression ratio can be calculated by the number of zero elements in the precoding weights, the data compression ratio becoming greater as the number of the zero elements becomes greater. In the example, the first UE selecting the second base station to provide no service will achieve a 33% data compression ratio effect. On the other hand, since the second base station does not service the first UE, the control unit 120 will not receive full channel state information. In one embodiment, the control unit 120 can calculate a null space matrix according to an interference channel matrix of the first UE, and then design the precoding weights for the first UE for each of the RRH serving the first UE based on the null space matrix.

Figure 3:
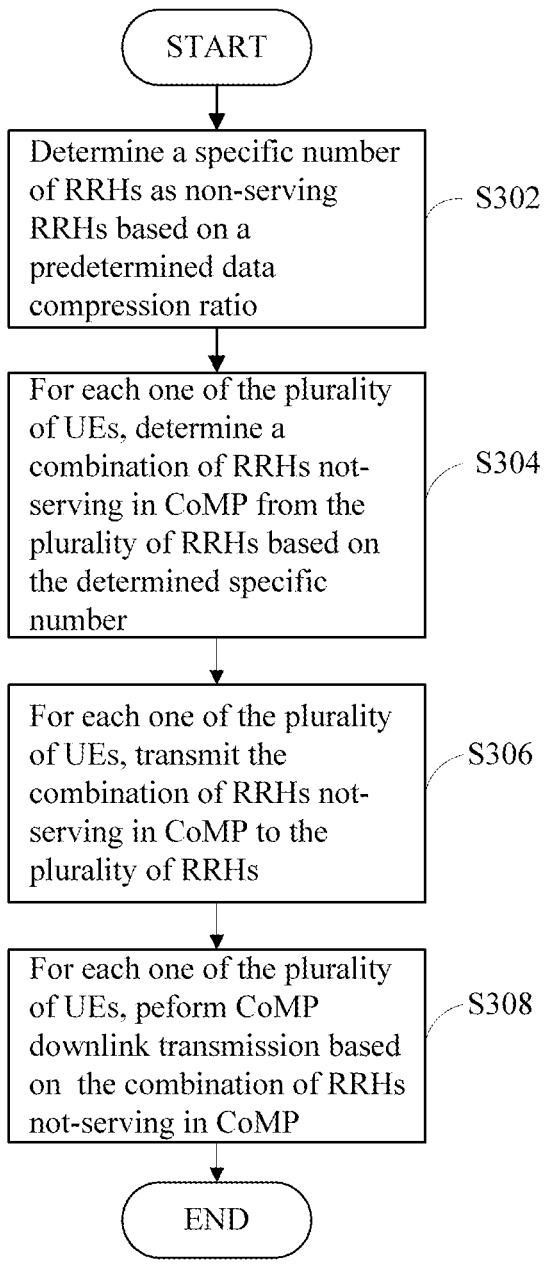
FIG. 3 is flowchart of one embodiment of a method for downlink transmission in C-RAN.

FIG. 3 illustrates a method for downlink transmission performed by the central unit 120 according to one embodiment. In the embodiment, the central unit 120 schedules CoMP with a predetermined data compression ratio.

At step S302, the central unit 120 determines a specific number of RRHs as non-serving RRHs based on the predetermined data compression ratio.

At step S304, for each one of the plurality of UEs, the central unit 120 determines a combination of RRHs which are non-serving in CoMP from the plurality of RRHs, based on the determined specific number.

In one embodiment, the determination as to the combination is performed by exhaustion in order to achieve maximum sum-rate in the C-RAN 100.

Let there be total N RRHs and total K UEs, and the central unit 120 needs to determine a combination of Z RRHs which are non-serving in CoMP for each UE. For each one of the plurality of UEs, there are $C_Z^N$ possible combinations of Z RRHs non-serving in CoMP. For each one of the possible combinations, the central unit 120 first collects CSI of the UE. The central unit 120 then forms an interference channel matrix of the UE based on the CSI, calculates a null space matrix of the interference channel matrix, and designs precoding weights for the UE based on the null space matrix. Finally, the central unit 120 calculates sum rate of the UE for the combination based on the precoding weights and the collected CSI. The central unit 120 collects sum rates of all the possible combinations, and determines the combination of RRHs which are non-serving in CoMP from the possible combinations based on the collected sum rates. For example, the central unit 120 compares sum rates of all the possible combinations for the UE, and determines one combination which has the maximal sum rate of the UE.

In another embodiment, the central unit 120 obtains $C_Z^N$ possible combinations of Z RRHs which are non-serving in CoMP for each one of the K UEs, and evaluates channel orthogonality for each possible combination. After the evaluation, the central unit 120 determines a combination of RRHs which are non-serving in CoMP from the plurality of RRHs for each one of the K UEs, based on the evaluation. For example, the central unit 120 can determine a combination of RRHs which are non-serving in CoMP from the plurality of RRHs for each one of the K UEs with strong channel orthogonality.

In this embodiment, the central unit 120 needs to design precoding weights only once for each one of the plurality of UEs for the plurality of RRHs.

In another embodiment, the central unit 120 obtains $C_Z^N$ possible combinations of Z RRHs which are non-serving in CoMP for each one of the K UEs, evaluates channel orthogonality and estimates channel gain for each possible combination. After making the evaluations and estimating channel gain for each possible combination for the K UEs, the central unit 120 determines a combination of RRHs which are non-serving in CoMP from the plurality of RRHs for each one of the K UEs based on the evaluations and the estimated channel gain. For example, the central unit 120 can determine a combination of RRHs which are non-serving in CoMP from the plurality of RRHs for each one of the K UEs, with strong channel orthogonality and maximal channel gain.

In this embodiment, the central unit 120 needs to design only once precoding weights for each one of the plurality of UEs for the plurality of RRHs.

At step S306, for each one of the plurality of UEs, the central unit 120 transmits the combination of RRHs which are non-serving in CoMP to the plurality of RRHs.

At step S308, for each one of the plurality of UEs, the central unit 120 performs CoMP downlink transmission based on the combination of RRHs which are non-serving in CoMP.

In one embodiment, before step S308, for each one of the plurality of RRHs, the central units 120 further determines a number of bits allocated for each one of the plurality of UEs, based on a bit budget. For example, the bit allocation problem can be formulated as a sum of symbol error rate (SER) at all the UEs in the C-RAN. The central units 120 can determine a number of bits allocated for each one of the UEs for each one of the plurality of RRHs based on the bit budget, the collected CSI, and the designed precoding weights.

Figure 4:
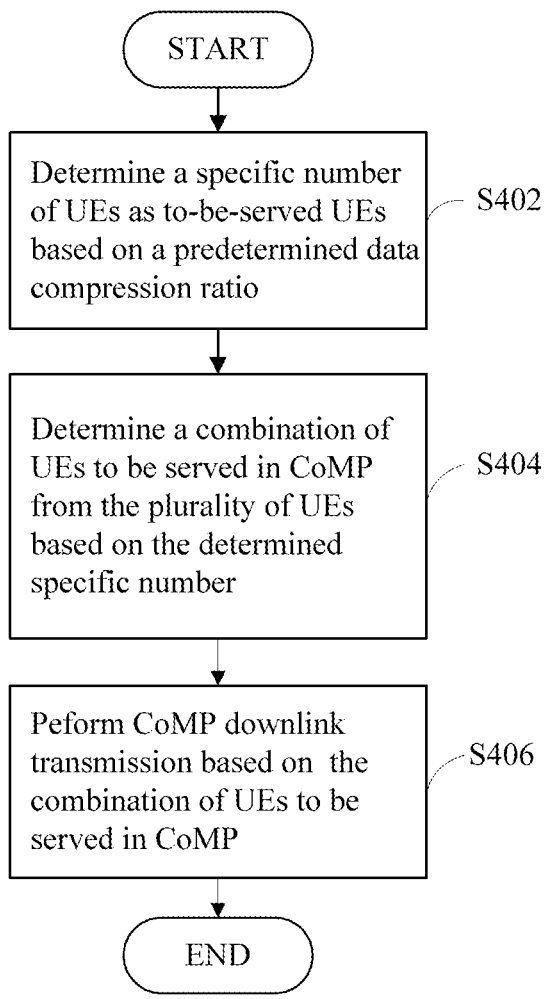
FIG. 4 is a flowchart of another embodiment of a method for downlink transmission.

FIG. 4 illustrates a method for downlink transmission performed by each one of the plurality of RRHs according to one embodiment. In the embodiment, the plurality of UEs feedback CSI to all the RRHs. Therefore, each RRH collects all the available CSI including those related to other RRHs. In the embodiment, each RRH schedules CoMP with a predetermined data compression ratio.

At step S402, each RRH determines a specific number of UEs as to-be-served UEs based on the predetermined data compression ratio.

At step S404, each RRH determines a combination of UEs to be served in CoMP from the plurality of UEs, based on the predetermined specific number.

In one embodiment, the determination as to the combination is performed by exhaustion in order to achieve maximum sum-rate in the C-RAN 100.

Let there be total K UEs, and each RRH needs to determine a combination of K' UEs to-be-served in CoMP. There are $C_{K'}^K$ possible combinations of K' UEs to be served in CoMP. For each one of the UEs of the possible combinations, RRH first collects CSI of the UE of the possible combination. The RRH then forms an interference channel matrix of the UE based on the CSI, calculates a null space matrix of the interference channel matrix, and designs precoding weights for the UE based on the null space matrix.

Finally, the RRH calculates sum rate of the UE for the possible combination based on the precoding weights and the collected CSI. The RRH collects sum rates of all the possible combinations, and determines the combination of UEs which are to be served in CoMP from all possible combinations, based on the collected sum rates. For example, the RRH compares sum rates of all the possible combinations, and determines one combination which has the maximal sum rate.

In another embodiment, the RRH obtains $C_{K'}^K$ possible combinations of K' UEs to be served in CoMP, and evaluates channel orthogonality for each possible combination. After evaluating channel orthogonality of each possible combination for the K' UEs, the RRH determines a combination of UEs to be served in CoMP from the plurality of UEs based on the evaluation. For example, the RRH can determine a combination of K' UEs to be served in CoMP from the plurality of UEs, with strong channel orthogonality.

In this embodiment, the RRH needs to design precoding weights for each one of the to-be-served UEs only once.

In another embodiment, the RRH obtains $C_{K'}^K$ possible combinations of K' UEs to be served in CoMP, evaluates channel orthogonality and estimates channel gain for each possible combination. After evaluating and estimating channel gain for each possible combination for the K' UEs, the RRH determines a combination of UEs to be served in CoMP from the plurality of UEs based on the evaluation and the estimation. For example, the RRH can determine a combination of UEs to be served in CoMP from the plurality of UEs with strong channel orthogonality and maximal channel gain.

In this embodiment, the RRH designs precoding weights for each one of the to-be-served UEs only once.

At step S406, each RRH performs CoMP downlink transmission based on the combination of UEs to be served in CoMP.

In one embodiment, before step S406, each RRH further determines a number of bits allocated for each one of the combinations of UEs to be served in CoMP based on a bit budget. For example, the bit allocation problem can be formulated as a sum of symbol error rate (SER) at all the plurality of UEs in the C-RAN must been minimize. Each RRH can determine a number of bits allocated for each one of the combinations of UEs to be served in CoMP based on the bit budget, the collected CSI, and the designed precoding weights.

Figure 5:
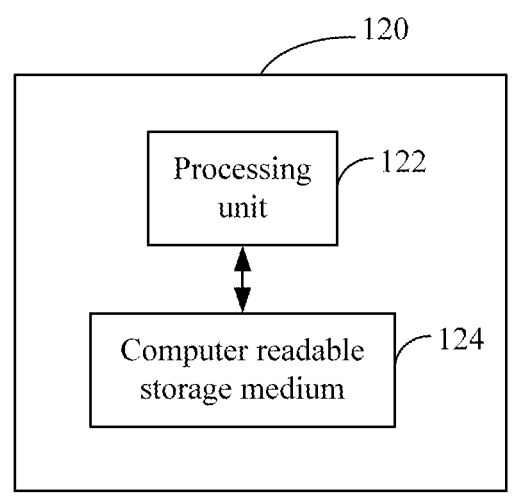
FIG. 5 is a block diagram of one embodiment of a central unit for downlink transmission in the C-RAN.

FIG. 5 illustrates a block diagram of the central unit 120 according to an embodiment. The central unit 120 comprises a processing unit 122, and a computer readable storage medium 124. The processing unit 122 is electrically connected to the computer readable storage medium 124. The processing unit 122 comprises a microcontroller, a microprocessor, or other circuit with processing capabilities, and executes or processes instructions, data, and computer programs stored in the computer readable storage medium 124. The computer readable storage medium 124 comprises a read-only memory (ROM), a random access memory (RAM), a magnetic disk storage medium device, an optical storage medium device, a flash memory device, electrical, optical, or other physical/tangible (e.g., non-transitory) memory device, etc. A computer-readable storage medium is used to store one or more computer programs that control the operation of the central unit 120 and executed by the processing unit 122. In the embodiment, the computer readable storage medium 124 stores or encodes one or more computer programs, and stores models, configurations, and computing parameters data, for the processing unit 120, to execute the method shown in FIG. 3.

Figure 6:
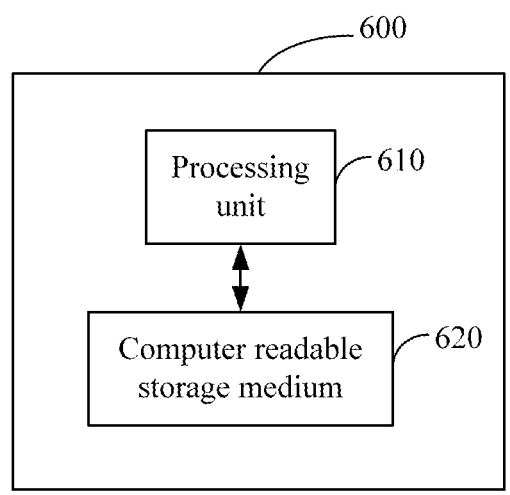
FIG. 6 is a block diagram for one embodiment of a radio remote head for downlink transmission in the C-RAN.

FIG. 6 illustrates a block diagram of an RRH 600 according to an embodiment. The RRH 600 comprises a processing unit 610, and a computer readable storage medium 620. The processing unit 610 is electrically connected to the computer readable storage medium 620. The processing unit 610 comprises a microcontroller, a microprocessor, or another circuit with processing capabilities, and executes or processes instructions, data, and computer programs stored in the computer readable storage medium 620. The computer readable storage medium 620 comprises a read-only memory (ROM), a random access memory (RAM), a magnetic disk storage medium device, an optical storage medium device, a flash memory device, electrical, optical, or other physical/tangible (e.g., non-transitory) memory device, etc. A computer-readable storage medium is used to store one or more computer programs that control the operation of the RRH 600 and executed by the processing unit 610. In the embodiment, the computer readable storage medium 620 stores or encodes one or more computer programs, and stores models, configurations, and computing parameters data for the processing unit 610 to execute the method shown in FIG. 4.

The method and apparatus for downlink transmission in the C-RAN achieves predetermined data compression ratio while maintaining optimal overall performance.

The embodiments shown and described above are only examples. Many details are often found in the art; therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method of downlink transmission applied in each of a plurality of remote radio heads (RRHs) in a cloud radio access network, the method comprising:
    determining a specific number of user equipment (UEs) as to-be-served UEs from a plurality of UEs based on a predetermined data compression ratio, in order to reduce fronthaul load, wherein a data compression ratio is calculated by a number of zero elements in precoding weights, the data compression ratio becoming greater as the number of zero elements becomes greater;
    determining a combination of UEs to be served in coordinated multi-point (CoMP) from the plurality of UEs based on the determined specific number, wherein the combination of UEs to be served is a selection of the determined specific number UEs as to-be-served from the plurality of UEs;
    performing CoMP downlink transmission based on the combination of UEs to be served in CoMP.

2. The method of claim 1, further comprising:
    determining a number of bit allocated for each one of a plurality combinations of UEs to be served in CoMP based on a bit budget.

3. The method of claim 1, wherein determining a combination of UEs to be served in coordinated multi-point (CoMP) from the plurality of UEs based on the determined specific number, further comprises:
obtaining a plurality of possible combinations of UEs to be served in CoMP based on the determined specific number;
for each one of the plurality of possible combinations, collecting channel state information of each UE of the possible combination;
for each one of the plurality of possible combinations, forming an interference channel matrix for the UE based on the channel state information;
for each one of the plurality of possible combinations, calculating a null space matrix of the interference channel matrix;
for each one of the plurality of possible combinations, designing precoding weights based on the null space matrix;
for each one of the plurality of possible combinations, calculating sum rate of the UE based on the precoding weights and the channel state information;
collects sum rates of all the plurality of possible combinations of UEs to be served in CoMP; and
determining the combination of UEs to be served in coordinated multi-point (CoMP) from the plurality of possible combinations based on the collected sum rates.

4. The method of claim 1, wherein determining a combination of UEs to be served in coordinated multi-point (CoMP) from the plurality of UEs based on the determined specific number, further comprises:
obtaining a plurality of possible combinations of UEs to be served in CoMP based on the determined specific number;
evaluating channel orthogonality for each of the plurality of possible combinations; and
determining the combination of UEs to be served in CoMP from the plurality of possible combinations based on the evaluated channel orthogonality.

5. The method of claim 1, wherein determining a combination of UEs to be served in coordinated multi-point (CoMP) from the plurality of UEs based on the determined specific number, further comprises:
obtaining a plurality of possible combinations of UEs to be served in CoMP based on the determined specific number;
evaluating channel orthogonality for each of the plurality of possible combinations;
estimating channel gain for each of the plurality of possible combinations; and
determining the combination of UEs to be served in CoMP from the plurality of possible combinations based on the channel orthogonality and the channel gain.

6. A remote radio head (RRH) for downlink transmission in a cloud radio access network, the RRH comprising:
a processing unit; and
a computer readable storage medium for storing at least one computer program, wherein the at least one computer program comprises instructions which are executed by the processing unit, and cause the processing unit to perform:
determining a specific number of user equipment (UEs) as to-be-served UEs from a plurality of UEs based on a predetermined data compression ratio, in order to reduce fronthaul load, wherein a data compression ratio is calculated by a number of zero elements in precoding weights, the data compression ratio becoming greater as the number of zero elements becomes greater;
determining a combination of UEs to be served in coordinated multi-point (CoMP) from the plurality of UEs based on the determined specific number, wherein the combination of UEs to be served is a selection of the determined specific number UEs as to-be-served from the plurality of UEs;
performing CoMP downlink transmission based on the combination of UEs to be served in CoMP.

7. The RRH of claim 6, wherein the process unit further performs:
determining a number of bit allocated for each one of a plurality combinations of UEs to be served in CoMP based on a bit budget.

8. The RRH of claim 6, wherein determining a combination of UEs to be served in coordinated multi-point (CoMP) from the plurality of UEs based on the determined specific number, further comprises:
obtaining a plurality of possible combinations of UEs to be served in CoMP based on the determined specific number;
for each one of the plurality of possible combinations, collecting channel state information of each UE of the possible combination;
for each one of the plurality of possible combinations, forming an interference channel matrix for the UE based on the channel state information;
for each one of the plurality of possible combinations, calculating a null space matrix of the interference channel matrix;
for each one of the plurality of possible combinations, designing precoding weights based on the null space matrix;
for each one of the plurality of possible combinations, calculating sum rate of the UE based on the precoding weights and the channel state information;
collects sum rates of all the plurality of possible combinations of UEs to be served in CoMP; and
determining the combination of UEs to be served in coordinated multi-point (CoMP) from the plurality of possible combinations based on the collected sum rates.

9. The RRH of claim 6, wherein determining a combination of UEs to be served in coordinated multi-point (CoMP) from the plurality of UEs based on the determined specific number, further comprises:
obtaining a plurality of possible combinations of UEs to be served in CoMP based on the determined specific number;
evaluating channel orthogonality for each of the plurality of possible combinations; and
determining the combination of UEs to be served in CoMP from the plurality of possible combinations based on the evaluated channel orthogonality.

10. The RRH of claim 6, wherein determining a combination of UEs to be served in coordinated multi-point (CoMP) from the plurality of UEs based on the determined specific number, further comprises:
obtaining a plurality of possible combinations of UEs to be served in CoMP based on the determined specific number;
evaluating channel orthogonality for each of the plurality of possible combinations;
estimating channel gain for each of the plurality of possible combinations; and determining the combination of UEs to be served in CoMP from the plurality of possible combinations based on the channel orthogonality and the channel gain.

* * * * *